United States Patent
Meeks

(10) Patent No.: US 7,666,304 B2
(45) Date of Patent: Feb. 23, 2010

(54) MAGNETIC FLUID CONDITIONER

(76) Inventor: Jasper L. Meeks, 3759 Highway 351, Abilene, TX (US) 79601

( * ) Notice: Subject to any disclaimer, the term of this patent is extended or adjusted under 35 U.S.C. 154(b) by 653 days.

(21) Appl. No.: 11/270,982

(22) Filed: Nov. 11, 2005

(65) Prior Publication Data

US 2007/0108116 A1 May 17, 2007

(51) Int. Cl.
*C02F 1/48* (2006.01)
*F02M 33/00* (2006.01)
(52) U.S. Cl. .................. 210/222; 210/695; 123/538
(58) Field of Classification Search .............. 210/222, 210/695; 123/538
See application file for complete search history.

(56) References Cited

U.S. PATENT DOCUMENTS

| | | | |
|---|---|---|---|
| 4,532,040 A | * | 7/1985 | Meeks et al. .............. 210/222 |
| 4,564,448 A | * | 1/1986 | O'Meara, Jr. .............. 210/222 |
| 5,871,642 A | * | 2/1999 | Meeks ....................... 210/222 |
| 5,882,514 A | * | 3/1999 | Fletcher ..................... 210/222 |

* cited by examiner

*Primary Examiner*—David A Reifsnyder
(74) *Attorney, Agent, or Firm*—W. Thomas Timmons

(57) ABSTRACT

A fluid treatment apparatus is disclosed which includes a casing through which fluid flows, an array of magnets in the casing, arranged substantially perpendicular to the side of the casing and therefore substantially perpendicular to the main flow of fluid through the casing, wherein the magnets within the array which lie substantially within the same perpendicular plane are spaced apart and arranged in alternating polarity, and means to support the array of magnets such that the space between the magnets within the array which lie substantially within the same perpendicular plane are substantially equal distances from the adjacent magnets to permit flow of fluid therethrough. In a one arrangement, the casing includes an outer casing made from a material which substantially restricts the magnetic field within the casing. An inner casing is made from a non-magnetic material such as stainless steel. Another arrangement of a fluid treatment apparatus includes an array of magnets in the casing, arranged in planes substantially perpendicular to the side of the casing and therefore substantially perpendicular to the main flow of fluid through the casing.

17 Claims, 2 Drawing Sheets

MAGNETIC FLUID CONDITIONER

CROSS-REFERENCE TO RELATED APPLICATIONS

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates generally to fluid treatment and, in particular, to magnetic treatment of fluid.

2. Description of Related Art

Magnetic treatment of fluid is well known. As shown in U.S. Pat. Nos. 4,532,040 and 5,871,642, magnets are normally arranged in the direction of fluid flow. This arrangement helps keep the magnetic forces concentrated.

BRIEF SUMMARY OF THE INVENTION

A fluid treatment apparatus according to the present invention includes a casing through which fluid flows, an array of magnets in the casing, arranged substantially perpendicular to the side of the casing and therefore substantially perpendicular to the main flow of fluid through the casing, wherein the magnets within the array which lie substantially within the same perpendicular plane are spaced apart and arranged in alternating polarity, and means to support the array of magnets such that the space between the magnets within the array which lie substantially within the same perpendicular plane are substantially equal distances from the adjacent magnets to permit flow of fluid therethrough.

In a preferred arrangement, the casing includes an outer casing made from a material which substantially restricts the magnetic field within the casing, such as mild steel. Black iron pipe is one such suitable mild steel outer casing. In one arrangement, an inner casing is made from a non-magnetic material such as stainless steel.

Another arrangement of a fluid treatment apparatus according to the present invention includes an inner casing comprising a non-magnetic material, through which fluid flows; an outer casing comprising a material which substantially restricts the magnetic field within the casing, an array of magnets in the casing, arranged in planes substantially perpendicular to the side of the casing and therefore substantially perpendicular to the main flow of fluid through the casing, wherein the magnets within the array which lie substantially within the same perpendicular plane are spaced apart and arranged in alternating polarity, and means to support the array of magnets such that the space between the magnets within the array which lie substantially within the same perpendicular plane are substantially equal distances from the adjacent magnets to permit flow of fluid therethrough.

The casing can be flanged at the ends or threaded or have other suitable coupling for placing in line with pipes carrying the fluid to be treated.

These and other objects, advantages and features of this invention will be apparent from the following description taken with reference to the accompanying drawing, wherein is shown a preferred embodiment of the invention.

DETAILED DESCRIPTION OF THE INVENTION

Figure 1:
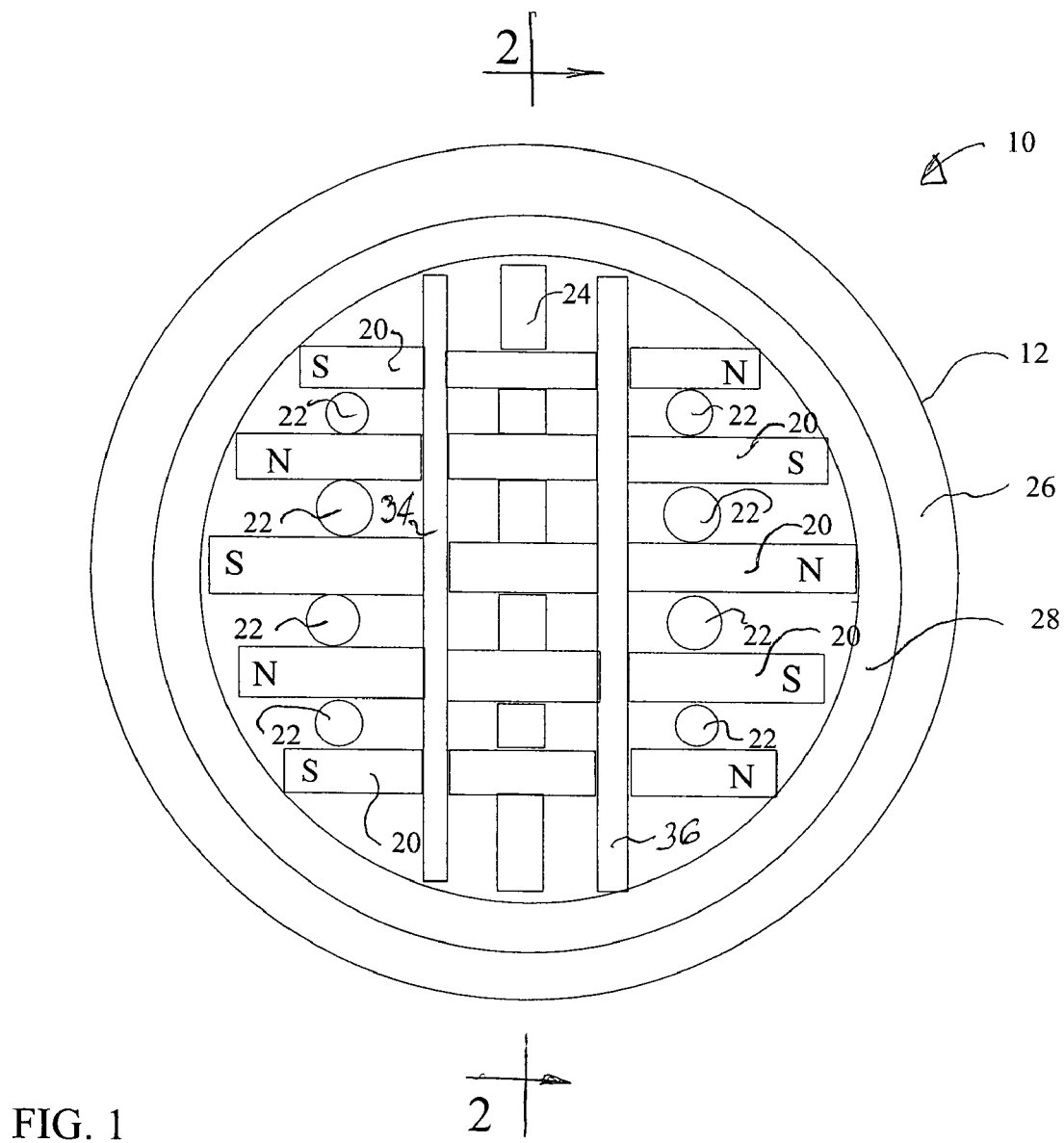
FIG. 1 is a top view of a fluid treatment apparatus according to the present invention.
Figure 2:
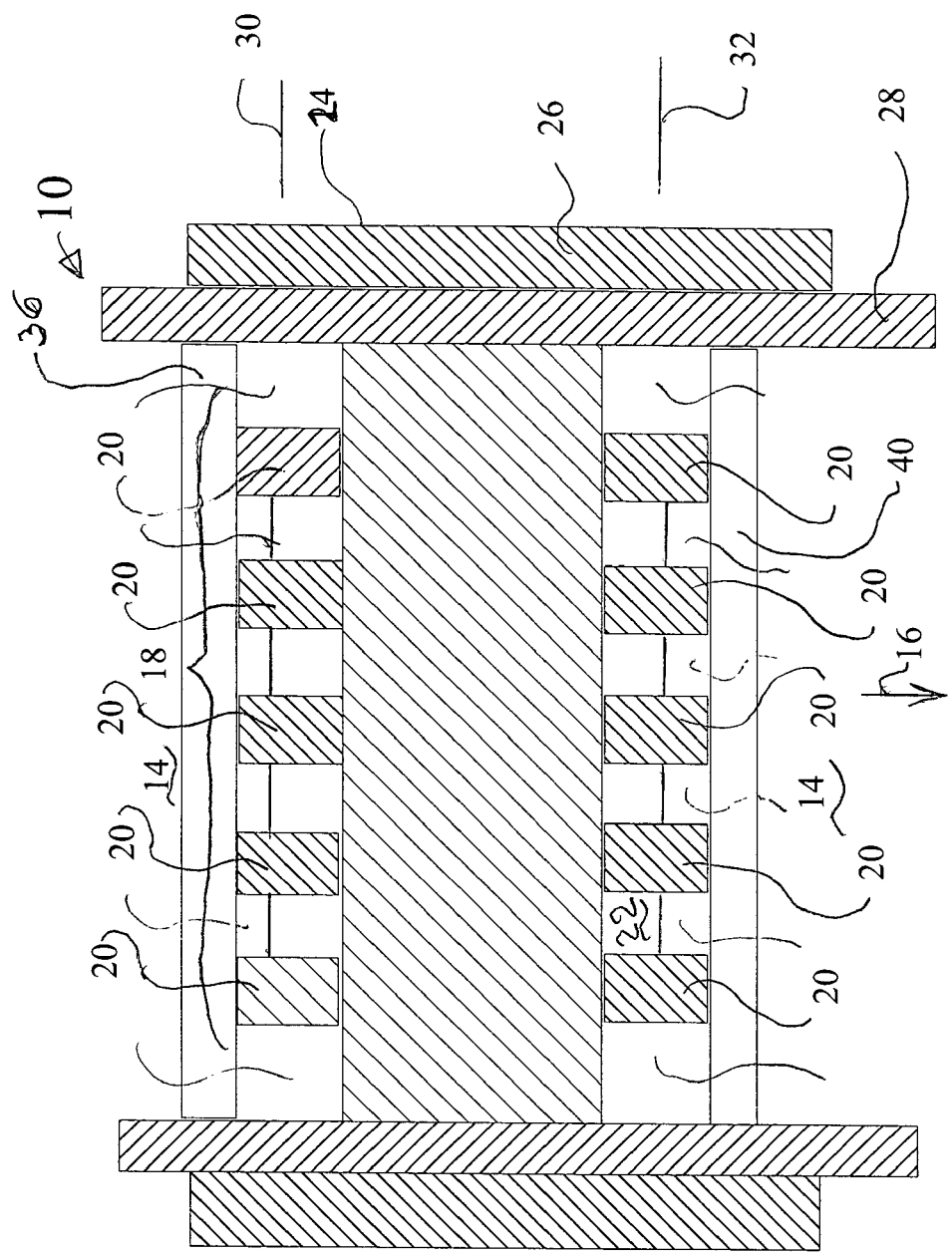
FIG. 2 is a sectional view of the fluid treatment apparatus of FIG. 1 taken along the lines 2-2.

Referring now to the drawing, and in particular to FIG. 1 and FIG. 2, a fluid treatment apparatus according to the present invention is referred to generally by reference numeral 10. Fluid treatment apparatus 10 includes a casing 12 through which fluid 14 flows substantially in direction 16. An array 18 of magnets 20 in the casing, are arranged substantially perpendicular to the side of the casing and therefore substantially perpendicular to the main flow of fluid through the casing. The magnets within array 18 which lie substantially within the same perpendicular plane are spaced apart and arranged in alternating polarity. Means to support the array of magnets such that the space between the magnets within the array which lie substantially within the same perpendicular plane are substantially equal distances from the adjacent magnets to permit flow of fluid therethrough. Such means can be stainless spacing tubes 22 or stainless support bar 24 or both.

In a preferred arrangement, casing 12 includes an outer casing 26 made from a material which substantially restricts the magnetic field within the casing, such as mild steel. Black iron pipe is one such suitable mild steel outer casing. In one arrangement, an inner casing 28 is made from a non-magnetic material such as stainless steel.

Another arrangement of a fluid treatment apparatus according to the present invention includes an inner casing comprising a non-magnetic material, through which fluid flows; an outer casing comprising a material which substantially restricts the magnetic field within the casing, an array of magnets in the casing, arranged in planes 30 and 32 substantially perpendicular to the side of the casing and therefore substantially perpendicular to the main flow of fluid through the casing, wherein the magnets within the array which lie substantially within the same perpendicular plane are spaced apart and arranged in alternating polarity, and means to support the array of magnets such that the space between the magnets within the array which lie substantially within the same perpendicular plane are substantially equal distances from the adjacent magnets to permit flow of fluid therethrough.

Stainless plates 34 and 36 are welded to the top of each tube holding magnets 20 and to the walls of casing 28, and stainless plates 38, not shown, and 40 are welded to the bottom of each tube holding magnets 20 and to the walls of 28. This gives extra support for the magnets but can also be used for shaping magnetic fields.

Casing 12 can be flanged at the ends or threaded or have other suitable coupling for placing in line with pipes carrying the fluid to be treated.

From the foregoing it will be seen that this invention is well adapted to attain all of the ends and objectives hereinabove set forth, together with other advantages which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the figures of the accompanying drawings is to be interpreted as illustrative and not in a limiting sense.

The invention claimed is:

1. A fluid treatment apparatus, comprising in combination:
    (a) a casing forming a side or sides through which fluid flows;
    (b) an array of magnets in the casing, arranged substantially perpendicular to the side of the casing and therefore substantially perpendicular to the main flow of fluid through the casing, wherein some of the magnets within the array lie within at least one plane which is substantially perpendicular to the side or sides of the casing and therefore substantially perpendicular to the main flow of fluid through the casing, and magnets which lie substantially within the same perpendicular plane are spaced apart from each other and arranged in alternating polarity; and
    (c) means to support the array of magnets such that the space between the magnets within the array which lie substantially within the same perpendicular plane are substantially equal distances from the adjacent magnets to permit flow of fluid therethrough.

2. The combination of claim 1 wherein the casing comprises an inner casing through which fluid flows and an outer casing, wherein the outer casing comprises a material which substantially restricts the magnetic field within the casing.

3. The combination of claim 2 wherein the inner casing comprises a non-magnetic material.

4. The combination of claim 2 wherein the inner casing comprises stainless steel.

5. The combination of claim 1 wherein the casing comprises an inner casing through which fluid flows and an outer casing, wherein the outer casing comprises mild steel.

6. The combination of claim 5 wherein the inner casing comprises a non-magnetic material.

7. The combination of claim 5 wherein the inner casing comprises stainless steel.

8. The combination of claim 1 wherein the casing comprises an inner casing through which fluid flows and an outer casing, wherein the outer casing comprises black iron pipe.

9. The combination of claim 8 wherein the inner casing comprises a non-magnetic material.

10. The combination of claim 8 wherein the inner casing comprises stainless steel.

11. A fluid treatment apparatus, comprising in combination:
    (a) an inner casing forming a side or sides, comprising a non-magnetic material, through which fluid flows;
    (b) an outer casing comprising a material which substantially restricts the magnetic field within the casing;
    (c) an array of magnets in the casing, arranged in planes substantially perpendicular to the side or sides of the casing and therefore substantially perpendicular to the main flow of fluid through the casing, wherein the magnets within the array which lie substantially within the same perpendicular plane are spaced apart from each other and arranged in alternating polarity; and
    (d) means to support the array of magnets such that the space between the magnets within the array which lie substantially within the same perpendicular plane are substantially equal distances from the adjacent magnets to permit flow of fluid therethrough.

12. The combination of claim 11 wherein the inner casing comprises stainless steel.

13. The combination of claim 11 wherein the outer casing comprises mild steel.

14. The combination of claim 13 wherein the inner casing comprises a non-magnetic material.

15. The combination of claim 13 wherein the inner casing comprises stainless steel.

16. The combination of claim 11 wherein the outer casing comprises black iron pipe.

17. The combination of claim 16 wherein the inner casing comprises stainless steel.

* * * * *